United States Patent
Cuoco

[11] 3,778,923
[45] Dec. 18, 1973

[54] AUTOMATIC MOUSE-TRAP DEVICE

[76] Inventor: Michael J. Cuoco, 2233 Helderberg Ave., Schenectady, N.Y. 12306

[22] Filed: June 8, 1972

[21] Appl. No.: 260,911

[52] U.S. Cl. ................................................. 43/69
[51] Int. Cl. .......................................... A01m 23/04
[58] Field of Search .................... 43/69, 70, 72, 74; 119/158

[56] References Cited
UNITED STATES PATENTS

| | | | |
|---|---|---|---|
| 2,490,540 | 12/1949 | Price | 43/69 |
| 1,738,623 | 12/1929 | Westerlund | 43/69 |
| 616,119 | 12/1898 | Lahann | 43/69 |
| 3,423,870 | 1/1969 | Kost | 43/69 |
| 1,335,882 | 4/1920 | Drag | 43/69 |
| 1,534,528 | 4/1925 | Kennedy | 43/69 |
| 2,234,983 | 3/1941 | Russell | 43/69 |
| 2,825,995 | 3/1958 | Snider | 43/69 |

*Primary Examiner*—Robert Peshock
*Assistant Examiner*—James H. Czerwonky
*Attorney*—Walter F. Wessendorf, Jr.

[57] ABSTRACT

Discloses an automatic mouse-trap device comprising a drowning receptacle having a receptacle cover which carry brackets pivotally mounting an unbalanced horizontal runway tube tiltable through an elongated slot in the receptacle cover. The device has an inoperative position where there is closed communication from the bait receptacle through the horizontal runway tube and verticle access tube to the bottom open end of the vertical access tube to localize odor from bait in the bait receptacle to attract rodent entry. The adjoining ends of the access tube, runway tube, and bait receptacle are formed with cooperating 45° angles. Weight of a rodent on the unbalanced side of the horizontal runway tube tilts it downward through the receptacle cover's elongated slot to dispose the rodent in the drowning receptacle and thereafter the overbalanced side of the horizontal runway tube automatically returns the horizontal runway tube to its inoperative position.

9 Claims, 6 Drawing Figures

PATENTED DEC 18 1973

3,778,923

AUTOMATIC MOUSE-TRAP DEVICE

This invention relates to an automatic mouse-trap device for enticing, trapping and drowning rodents along with convenient means for sanitary removal and disposal of such trapped and drowned rodents.

Mice and rats, referred to as rodents herein, eat, spoil and contaminate extraordinary quantities of grains, cereals, meats, eggs and other foods each year. Potent poisons were initially successful in destroying and controlling the rodent population; however, rodents have become increasingly immune to the lethal effects of such potent poisons. Harmful and dangerous results to children and domestic animals have arisen from the use of such potent poisons to destroy and control the rodent population because of the comsumption of such potent poisons by children and domestic animals. The safe and sure means to destroy and control the rodent population is to physically trap and drown the rodents coupled with sanitary disposal. Accordingly, the objects of this invention are to contribute to solving the discussed problems of the art by providing a safe and inexpensive automatic mouse-trap device of simple construction whereby, in its inoperative position, there is closed communication to the bait to permit its odor to attract and entice a rodent to enter the device, whereby, in its operative position, the attracted and enticed rodent is disposed into a drowning receptacle containing a liner and whereafter the device automatically returns to its inoperative position, and whereby the liner in the drowning receptacle can be easily and simply removed to provide sanitary disposal of the trapped and drowned rodents.

These objects and other objects of this invention should be discerned and appreciated from the detailed specification taken in conjunction with the drawings, wherein like reference numerals refer to similar parts throughout the several views, in which.

To facilitate the understanding of this invention in conjunction with the drawings, a nomenclature list is herewith provided:

NOMENCLATURE

| | |
|---|---|
| 1 | generally refers to the invention |
| 3 | drowning receptacle |
| 5 | receptacle cover |
| 7 | vertical access tube |
| 9 | horizontal runway tube |
| 11 | bait receptacle |
| 13 | spacer element |
| 15 | end |
| 17 | end |
| 19 | felt strip |
| 21 | end |
| 23 | end |
| 25 | end |
| 27 | L-shaped bracket |
| 29 | L-shaped bracket |
| 31 | bottom leg |
| 33 | bottom leg |
| 35 | upstanding top leg |
| 37 | upstanding top leg |
| 39 | bearing slot |
| 41 | bearing slot |
| 43 | trunnion |
| 45 | trunnion |
| 47 | indicator |
| 49 | hole |
| 51 | trip tab |
| 53 | bait cover |
| 55 | ring |
| 57 | bait holder |
| 59 | bait guard |
| 61 | upstanding tongue |
| 63 | horizontal slots |
| 65 | nose hole |
| 67 | depending latch |
| 69 | slit |
| 71 | slot |
| 73 | slot |
| 75 | elongated slot |
| 77 | arcuate portion |
| 79 | liner |
| 81 | drain holes |
| 83 | receptacle sleeve |
| 85 | finger holes |
| 87 | liquid level indication |

Figure 1:
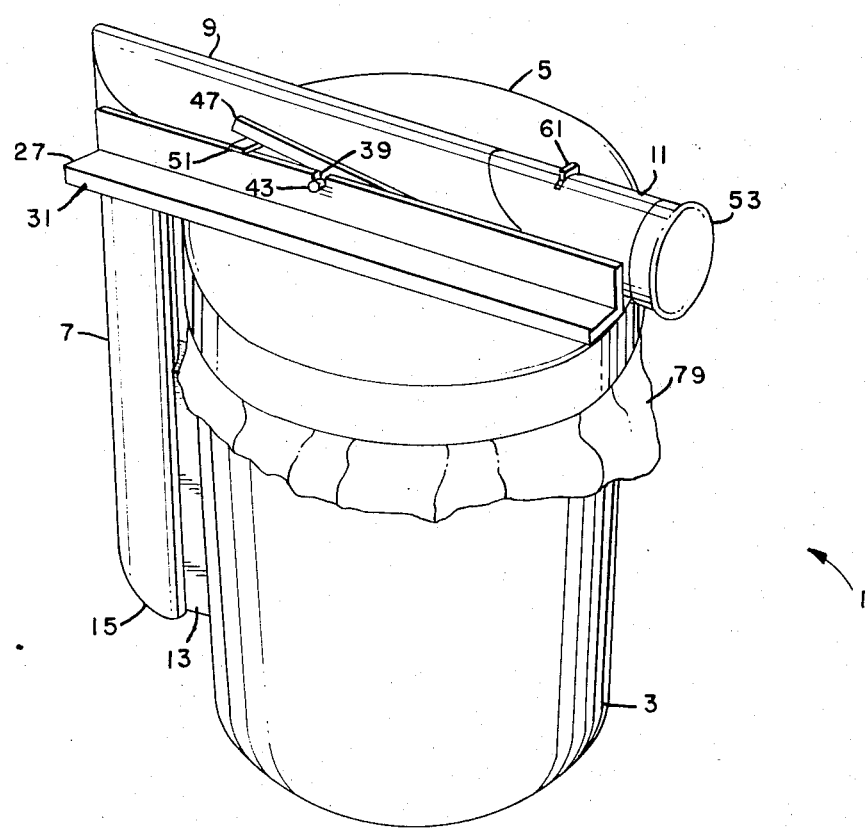
FIG. 1 is a view of the automatic mouse-trap device of this invention.
Figure 2:
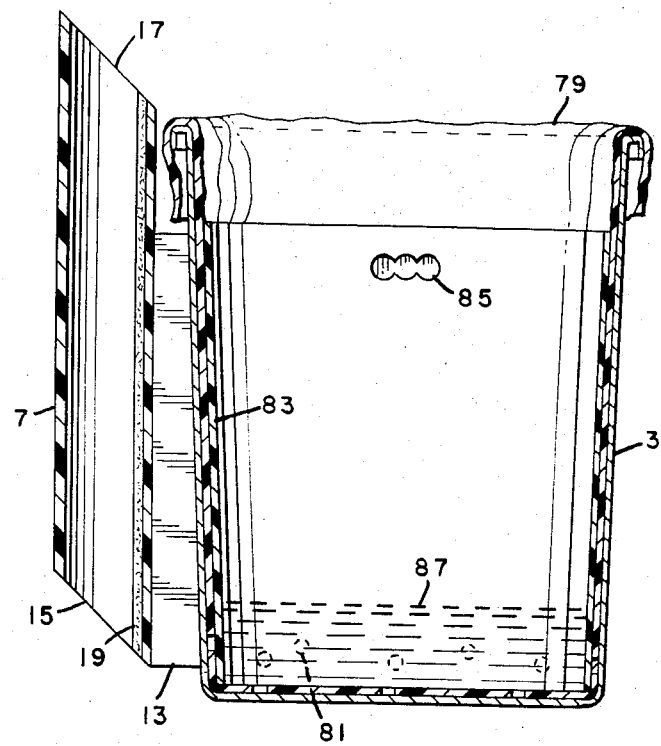
FIG. 2 is a partial sectional view of the automatic mouse-trap device as shown in FIG. 1.

In FIG. 1 of the drawings, reference numeral 1 generally refers to the invention. The mouse-trap device 1 comprises a drowning receptacle 3, receptacle cover 5, vertical access tube 7, tiltable horizontal runway tube 9 and bait receptacle 11. The horizontal runway tube 9 is made of hard plastic having a slippery internal surface.

Spacer element 13 is disposed between the drowning receptacle 3 and the vertical access tube 7, and is suitably fixed to drowning receptacle 3 and vertical access tube 7 such as by gluing. The surface of spacer element 13, in common abutting relationship with drowning receptacle 3, is complemental therewith; and the surface of spacer element 13, in common abutting relationship with vertical access tube 7, is complemental therewith.

The ends 15 and 17 of vertical access tube 7 are formed as 45° angles, and a felt strip 19 is disposed, as shown, within vertical access tube 7 and is suitably fixed therewith such as by gluing. The ends 21 and 23 of horizontal runway tube 9 are formed as 45° angles. One end 25 of bait receptacle 11 is formed as a 45° angle.

L-shaped brackets 27 and 29 are disposed, as shown, on the top portion of receptacle cover 5 with their respective bottom legs 31 and 33 suitably fixed to receptacle cover 5 such as by gluing. Bait receptacle 11 is disposed between and in abutting relationship with the upstanding top legs 35 and 37, respectively, of L-shaped brackets 27 and 29, and is suitably fixed therewith such as by gluing. Suitably formed through upstanding top legs 35 and 37 are aligned bearing slots 39 and 41, respectively, which carry and mount respective trunnions 43 and 45 oppositely extending from the sides of horizontal runway tube 9 in transverse relationship therewith.

Trunnions 43 and 45 as disposed and carried on horizontal runway tube 9 are located offset from the imaginary balancing pivot point thereon such that horizontal runway tube 9 is slightly unbalanced in its described mounting on L-shaped brackets 27 and 29 and is thereby constrained by gravity to rotate in that direction whereby end 21 of horizontal runway tube 9 and end 17 of vertical access tube 7 are maintained in abutting relationship and thereby in closed communication.

Figure 3:
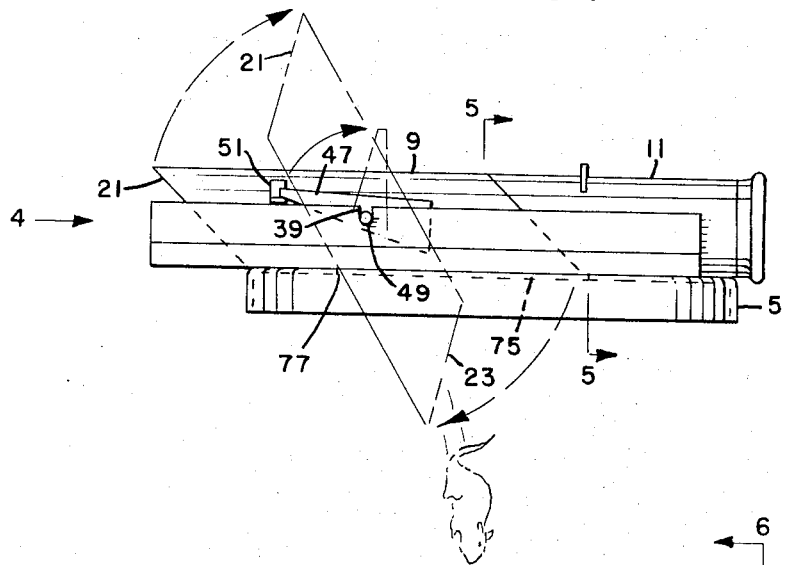
FIG. 3 is a view showing the receptacle cover, an L-shaped bracket, the horizontal runway tube, the indicator, the bait receptacle and its cover.
Figure 4:
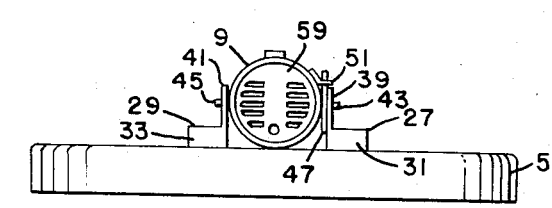
FIG. 4 is a view in the direction of the arrow 4 in FIG. 3.
Figure 5:
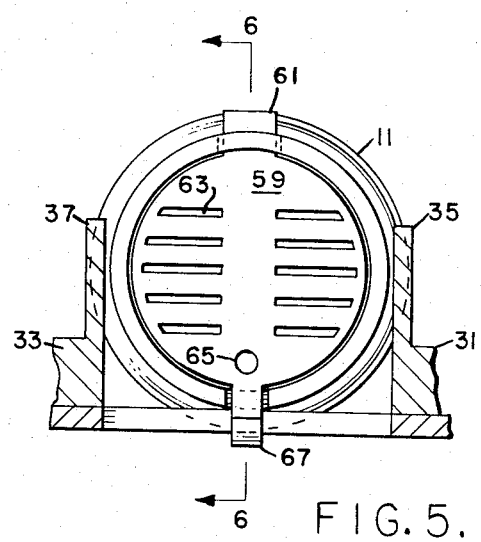
FIG. 5 is a sectional view, taken in the direction of the arrows 5—5 in FIG. 3.
Figure 6:
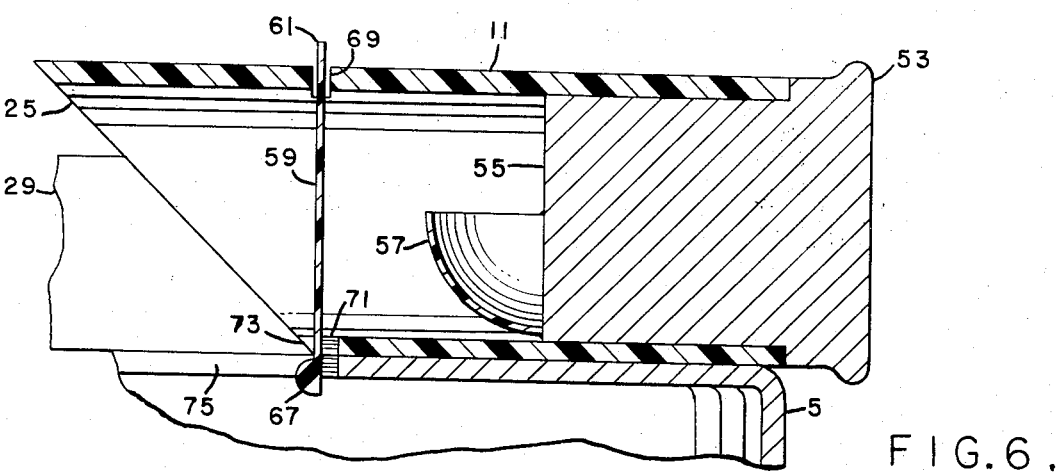
FIG. 6 is a sectional view, taken in the direction of the arrows 6—6 in FIG. 5.

Indicator 47, as shown, has a hole indicated by reference numeral 49 as receiving trunnion 43 therethrough for mounting relationship therewith. Trip tab 51, as shown, carried on horizontal runway tube 9, functions as a limit stop to maintain indicator 47 in its inoperative horizontally disposed position, and when horizontal runway tube 9 tilts, trip tab 51 functions to trip indicator 47 to its vertical indicating position, as shown in FIG. 3 of the drawings.

The diameter of bait cover 53 is sufficiently greater than the external diameter of bait receptacle 11 to thereby facilitate manipulation thereof in removing or replacing bait cover 53. Ring 55 is suitably fixed to bait cover 53 such as by gluing. The external diameter of ring 55 is slightly greater than the internal diameter of bait receptacle 11 to achieve a slight force fit for purposes of removable retention. Bait holder 57, as shown, is suitably fixed to ring 55 such as by gluing. Bait guard 59, as shown, has an upstanding tongue 61, horizontal slots 63 formed therethrough, a nose hole 65 and a depending latch 67. A slit 69, as shown, formed in bait receptacle 11, removably receives therein tongue 61 in retentive relationship.

Aligned slots, as indicated by reference numerals 71 and 73, are formed in bait receptacle 11 and horizontal runway tube 9, respectively. When horizontal runway tube 9 is in its horizontally disposed inoperative position, as is shown in solid lines in FIGS. 1 and 3, latch 67 is in slight engagement with the bottom portion of slot 73 to slightly maintain horizontal runway tube 9 in its inoperative position. When horizontal runway tube 9 is tilted, slot 73 engages latch 67 sufficiently to move latch 67 toward and within slot 71 of bait receptacle 11 to thereby permit unrestrained, further downward rotary tilting movement of horizontal runway tube 9. Upon return movement of horizontal runway tube 9, slot 73 rides over latch 67 and the bottom of slot 73 again is slightly engaged by latch 67.

An elongated slot 75, as shown, is formed through receptacle cover 5 to permit horizontal runway tube 9 to move within drowning receptacle 3 in its operative downward tilting movement. The arcuate portion of elongated slot 75 is indicated by reference numeral 77 and is complemental with the surface of horizontal runway tube 9. This arcuate portion 77 of elongated slot 75, upon abutment therewith by horizontal runway tube 9, functions as a limit stop to prevent further downward movement of horizontal runway tube 9 and as is more clearly shown by the broken line position of horizontal runway tube 9 in FIG. 3.

In operation of the device 1, a liner 79 is disposed, as shown, within the drowning receptacle 3. Liner 79 is provided with drain holes 81 in the bottom thereof, as shown. A receptacle sleeve 83, as shown, does not have a bottom, is substantially complemental with the internal wall of drowning receptacle 3 and has finger holes 85, as shown, which are provided in the top portion of receptacle sleeve 83 to facilitate placement of receptacle sleeve 83 within and its removal from drowning receptacle 3. Drowning receptacle 3 is filled with water or other suitable liquid to a suitable height, as indicated by reference numeral 87, to effect the drowning of any rodents trapped and disposed with drowning receptacle 3.

Suitable bait such as strong cheese is disposed within bait holder 57 and the odor from such bait will carry through bait guard 59, horizontal runway tube 9 and vertical access tube 7 to thereby attract and entice a rodent to enter vertical access tube 7. The arrangement, construction and disposition, as described and shown, of the vertical access tube 7, horizontal runway tube 9 and bait receptacle 11 are such that, in the inoperative position of the horizontal runway tube 9, there is closed communication from bait receptacle 11 through horizontal runway tube 9 and vertical access tube 7 to its bottom end 15; and, hence, the odor from the bait in bait holder 57 will be localized at bottom end 15 of vertical access tube 7. Thusly attracted by such localized odor and the entrance hole provided by the bottom open end 15 of vertical access tube 7, the rodent will be induced and enticed to climb the vertical access 7 facilitated by felt strip 19 and to enter horizontal runway tube 9 to "get at" the source of the odor from the bait in bait holder 57. Inasmuch as the bait is at the opposite end of the horizontal runway tube 9 from which the rodent enters horizontal runway tube 9, the rodent will be further attracted and enticed to move to such opposite end of horizontal runway tube 9 to "get at" the bait. The slippery internal surface of horizontal runway tube 9 makes and renders it difficult for the enticed rodent to remove itself rearwardly and the increasing odor of and from the nearness to the bait constrains the rodent to move along the horizontal runway tube 9 in the direction of the bait in the bait holder 57. The purpose of the nose hole 65 of bait guard 59 is to attract and entice the rodent to further lunge or move quickly towards bait guard 59 with the rodent's nose directed downward toward nose hole 65.

Once the rodent has passed the pivot point of the trunnions 43 and 45, the weight of the rodent will overbalance horizontal runway tube 9 to cause it to tilt in rotary downward movement through elongated slot 75 of receptacle cover 5 and thereby dispose the rodent within the liquid filled drowning receptacle 3 where eventually the trapped rodent will drown. Simultaneous with such downward rotary movement of the horizontal runway tube 9, trip tab 51 trips indicator 47 to its vertical indicating position, as shown more clearly by the broken line position of indicator 47 in FIG. 3, to thereby indicate that a rodent is trapped within drowning receptacle 3.

After the rodent is disposed and trapped in drowning receptacle 3, the normally overbalanced side of horizontal runway tube 9 will automatically cause horizontal runway tube 9 to return by force of gravity to its horizontally disposed inoperative position, which position will allow another rodent to be attracted and trapped. Indicator 47 thereupon can simply be manually reset to its horizontally disposed position. It should be appreciated that the 45° ends 17 and 21 of vertical access tube 7 and horizontal runway tube 9, respectively, when such ends 17 and 21 are in abutting relationship, form a 90° angle represented by the articulation of the horizontal runway tube 9 relative to the vertical access tube 7, that the side of the horizontal runway tube 9 represented and delineated by and from the pivot point of the trunnions 43 and 45 to end 21 is overbalanced and by force of gravity constrains this overbalanced side to downward rotary movement to the left, as viewed in FIGS. 1 and 3, and that the end 17 of vertical access tube 7 which is fixed and rigid functions as a limit stop upon abutment of end 21 with end 17 to prevent further downward rotary movement of horizontal runway tube 9.

The receptacle sleeve 83 has a slippery internal surface which contributes to another purpose of receptacle sleeve 83 in preventing a rodent trapped in drowning receptacle 3 from scratching through receptacle sleeve 83, liner 79 and the wall of drowning receptacle 3. The liquid level 87 in the drowning receptacle 3 should be maintained of that sufficient height that the trapped rodent will eventually drown but will not be able to reach and scratch out the bottom of liner 79.

After a sufficient number of rodents have been trapped and drowned in the drowning receptacle 3, their sanitary removal is facilitated simply by first removing the receptacle cover, appropriate manipulation of the finger holes 85 to remove receptacle sleeve 83 and then slowly lifting out the liner 79 while at the same time allowing the liquid within liner 79 to drain through the drain holes 81 into the drowning receptacle 3. To prepare the device 1 for purposes of trapping and drowning rodents, the reverse order would be followed. In this connection, it should further be appreciated that the vertical access tube is disposed and positioned between the upstanding top legs 35 and 37 of respective L-shaped brackets 27 and 29, and that, as such, the upstanding top legs 35 and 37 function as positioning guides for emplacement of the receptacle cover 5 upon the drowning receptacle 3.

It should be appreciated that it is within the scope of this invention to utilize a drowning receptacle and receptacle sleeve that is square-shaped or rectangular-shaped in cross-sectional configuration along with an appropriate receptacle cover therefor. Likewise it is within the scope of this invention to utilize a vertical access tube, horizontal runway tube and bait receptacle whose cross-sectional configurations would be square-shaped or rectangular-shaped. The preferred choice of material for vertical access tube, horizontal runway tube and bait receptacle is plastic. In plastic profile extrusions, the terminology of tube or tubing includes extrusions whose cross-sectional configurations may be round, square, rectangular etc. Accordingly, the expressions heretofore and in the claims which follow with respect to access tube and runway tube do not and are not meant to be limited to clements whose cross-sectional configurations are round.

Having thusly described my invention, I claim:

1. An automatic mouse-trap device comprising a drowning receptacle having a receptacle cover, an access tube, brackets, a runway tube and a bait receptacle; said drowning receptacle mounting said access tube, said receptacle cover mounting said brackets, said brackets mounting said bait receptacle, said runway tube having trunnions, said brackets pivotally mounting said trunnions, said runway tube being divided by the pivotal mounting of said trunnions into an unbalanced side and an overbalanced side, said access tube, runway tube and bait receptacle having cooperating, adjoining ends, said ends of said access tube and runway tube being formed as 45° angles and one of said ends of said bait receptacle being formed as a 45° angle, said receptacle cover having an elongated slot permitting movement therethrough of said runway tube in its downward tilting movement, and said bait receptacle having a bait holder for holding bait; said runway tube having an inoperative position wherein and whereby its said overbalanced side constrains said runway tube to maintain its normally disposed position effecting closed communication from said bait receptacle through said runway tube and access tube to the open bottom end of said access tube to thereby localize the odor from said bait at said open bottom end of said access tube to attract rodents, said runway tube having an operative position in which the weight of a rodent on the said unbalanced side of said runway tube effects and tilts said runway tube in a downward rotary movement through said elongated slot of said receptacle cover to thereby dispose and trap the rodent in said drowning receptacle, and thereafter the said overbalanced side of said runway tube automatically returns said runway tube to its said inoperative position.

2. An automatic mouse-trap device in accordance with claim 1, wherein said access tube has a felt strip to facilitate a rodent's climbing said access tube and said runway tube has a slippery internal surface to render it difficult for a rodent to remove itself rearwardly from said runway tube.

3. An automatic mouse-trap device in accordance with claim 1, wherein one of said trunnions mounts an indicator, said runway tube has a trip tab funtioning as a limit stop in its abutment with said indicator to maintain said indicator in a position corresponding to the inoperative position of said runway tube and, in the operative position of said runway tube, said trip tab functions to trip said indicator to its indicating position.

4. An automatic mouse-trap device in accordance with claim 1, wherein said bait receptacle has a bait cover of sufficiently greater external diameter than said bait receptacle to facilitate manipulative removal or replacement of said bait cover and wherein said bait cover has a ring removably retained by slight force fit within said bait receptacle.

5. An automatic mouse-trap device in accordance with claim 1, wherein said bait receptacle carries a bait guard having slots and a nose hole whose purpose is to attract a rodent to lunge towards said bait guard with its nose directed downward towards said nose hole.

6. An automatic mouse-trap device in accordance with claim 1, wherein said bait receptacle carries a bait guard having a latch and wherein said latch is in slight engagement with a bottom portion of said runway tube to slightly maintain said runway tube in its inoperative position.

7. An automatic mouse-trap device in accordance with claim 1, wherein said elongated slot of said receptacle cover has an arcuate portion and wherein, upon abutment of said runway tube with said arcuate portion in the operative position of said runway tube, said arcuate portion functions as a limit stop to prevent further downward movement of said runway tube.

8. An automatic mouse-trap device in accordance with claim 1, wherein said drowning receptacle has a liner and a receptacle sleeve in its interior, said liner being disposed intermediate said drowning receptacle and said receptacle sleeve, said liner having drain holes in its bottom to allow liquid drainage through said drain holes to facilitate removal of said liner from said drowning receptacle, said receptacle sleeve maintaining said liner against the interior wall of said drowning receptacle and preventing a trapped rodent in said drowning receptacle from scratching through said liner and wall of said drowning receptacle, and said receptacle sleeve having finger holes to facilitate its placement within and removal from said drowning receptacle.

9. An automatic mouse-trap device in accordance with claim 1, wherein said access tube has a felt strip to facilitate a rodent's climbing said access tube and said runway tube has a slippery internal surface to render it difficult for a rodent to remove itself rearwardly from said runway tube; wherein one of said trunnions mounts an indicator, said runway tube has a trip tab functioning as a limit stop in its abutment with said indicator to maintain said indicator in a position corresponding to the inoperative position of said runway tube and, in the operative position of said runway tube, said trip tab functions to trip said indicator to its indicating position; wherein said bait receptacle has a bait cover of sufficiently greater external diameter than said bait receptacle to facilitate manipulative removal or replacement of said bait cover, said bait cover has a ring removably retained by slight force fit within said bait receptacle; wherein said bait receptacle carries a bait guard having slots and a nose hole whose purpose is to attract a rodent towards said bait guard with its nose directed downward towards said nose hole, and said bait guard has a latch in slight engagement with a bottom portion of said runway tube to slightly maintain said runway tube in its inoperative position; wherein said elongated slot of said receptacle cover has an arcuate portion which functions, upon abutment of said runway tube with said arcuate portion in the operative position of said runway tube, as a limit stop to prevent further downward movement of said runway tube; and wherein said drowning receptacle has a liner and a receptacle sleeve disposed in the interior of said drowning receptacle, said liner is disposed intermediate said drowning receptacle and said receptacle sleeve, said liner has drain holes in its bottom to allow liquid drainage through said drain holes to facilitate removal of said liner, said receptacle sleeve maintains said liner against the interior wall of said drowing receptacle and prevents a trapped rodent in said drowning receptacle from scratching through said liner and wall of said drowning receptacle, and said receptacle sleeve has finger holes to facilitate placement of said receptacle sleeve and removal of said receptacle sleeve from said drowning receptacle.

\* \* \* \* \*